(12) United States Patent
Abels et al.

(10) Patent No.: US 7,216,024 B1
(45) Date of Patent: May 8, 2007

(54) INDUSTRIAL TRUCK WITH A STABILIZING DEVICE

(75) Inventors: Theodor Abels, Aschaffenburg (DE); Siegfried Iwanowski, Stockstadt (DE)

(73) Assignee: Linde Aktiengesellschaft, Wiesbaden (DE)

( * ) Notice: Subject to any disclaimer, the term of this patent is extended or adjusted under 35 U.S.C. 154(b) by 873 days.

(21) Appl. No.: 09/620,521

(22) Filed: Jul. 20, 2000

(30) Foreign Application Priority Data

| Jul. 27, 1999 | (DE) | 199 35 151 |
| Oct. 20, 1999 | (DE) | 199 50 569 |
| Mar. 2, 2000 | (DE) | 100 10 011 |

(51) Int. Cl.
   *B66F 9/06* (2006.01)
   *G05B 19/37* (2006.01)
(52) U.S. Cl. .......................... 701/50; 37/304; 340/685
(58) Field of Classification Search ............... 701/50; 37/304, 348, 91, 382, 407; 340/685, 666, 340/668

See application file for complete search history.

(56) References Cited

U.S. PATENT DOCUMENTS

| 3,677,427 | A | * | 7/1972 | Allen .......................... 214/140 |
| 3,815,116 | A | * | 6/1974 | Fink ............................. 340/267 |
| 4,168,934 | A | * | 9/1979 | Downing et al. ............. 414/636 |
| 4,354,568 | A | * | 10/1982 | Griesenbrock .............. 180/197 |
| 4,518,044 | A | * | 5/1985 | Wiegardt et al. .............. 172/7 |
| 4,520,443 | A | * | 5/1985 | Yuki et al. ................... 364/424 |
| 4,530,057 | A | * | 7/1985 | Ahlbom ....................... 364/424 |
| 4,714,399 | A | * | 12/1987 | Olson .......................... 414/621 |
| 4,828,066 | A | * | 5/1989 | Hayashi ....................... 180/142 |
| 4,964,679 | A | * | 10/1990 | Rath ............................ 303/100 |
| 5,929,388 | A | * | 7/1999 | Uehara et al. ............... 177/136 |
| 5,937,965 | A | * | 8/1999 | Takagi et al. ................ 180/422 |
| 5,947,516 | A | * | 9/1999 | Ishikawa ..................... 280/755 |
| 6,050,770 | A | * | 4/2000 | Avitan ......................... 414/636 |
| 6,062,804 | A | * | 5/2000 | Young et al. ................ 414/517 |
| 6,202,013 | B1 | * | 3/2001 | Anderson et al. ............. 701/50 |

FOREIGN PATENT DOCUMENTS

DE             891883  A1        1/1999

* cited by examiner

*Primary Examiner*—Dalena Tran
(74) *Attorney, Agent, or Firm*—The Webb Law Firm

(57) ABSTRACT

An industrial truck, in particular a counterbalanced fork lift truck, has a stabilizing device to increase its stability against tipping. The invention teaches that a plurality of wheel load sensors ($R_1$, $R_2$, $R_3$, $R_4$), each of which corresponds to an individual wheel (1, 2, 3, 4) are connected to a monitoring device (5) which controls and/or regulates the load lifting system (7) and/or the truck drive system (8) (actuator units for the inclination of a lifting mast (H) and/or the height of the load and/or the truck speed or acceleration and/or the braking intensity and/or the steering angle). The wheel load sensors ($R_1$, $R_2$, $R_3$, $R_4$) are preferably provided on all the wheels (1, 2, 3, 4) and are each integrated into the respective wheel bearing. The monitoring device (5) has an evaluation unit (6) which determines the transverse tipping forces and/or the longitudinal tipping forces and/or the tipping moments and/or the load. Also connected to the monitoring unit (5), which can also determine the speed of the truck and the steering angle, are speed-of-rotation sensors ($S_U$, $S_G$) of at least the wheels of one axle.

6 Claims, 2 Drawing Sheets

INDUSTRIAL TRUCK WITH A STABILIZING DEVICE

BACKGROUND OF THE INVENTION

1. Field of the Invention

This invention relates generally to an industrial truck having a stabilizing device to increase the stability of the truck.

2. Technical Considerations

When industrial lift trucks, and in particular counterbalanced fork lift trucks, are operated incorrectly or are used for purposes other than those for which they were designed, the vehicle may tip over sideways, in which case the driver could be seriously injured or even killed. Industrial trucks can also tip over forward, e.g., in the event of sudden braking when the load is raised. Finally, there are also critical operating conditions in which the rear axle, i.e., the steering axle, could lift up when the brakes are applied. Therefore, attempts have been made to increase the stability of industrial trucks and/or to emit alarm signals in the event of unsafe operating conditions.

For example EP 0 891 883 A1 describes a generic industrial truck in which the load status is monitored by means of various sensors, and in which the steering axle, which is in the form of a floating or swing axle on the rear end of the truck, is locked (hydraulic stop) in certain operating conditions to increase stability. The load status is monitored by a load height sensor which measures the height of the load-holding device, a load sensor which measures the hydraulic pressure of the lifting cylinder, a load inclination sensor which measures the inclination of the tilting cylinder and thus of the lifting mast, a steering angle sensor which measures the deflection or angle of the steered wheels, and a speed sensor. This construction is technically quite complex and may not achieve the desired effect of increasing stability under all operating conditions.

Therefore, it is an object of the invention to provide an industrial truck of the type described above that has a stabilizing device with a simple construction to increase stability and that makes it possible to stabilize the industrial truck under almost all operating conditions.

SUMMARY OF THE INVENTION

The invention teaches that a plurality of wheel load sensors, preferably one for each wheel, that are configured to measure the wheel load are connected to a monitoring device which controls the load lifting system and/or the drive system in an open-loop or closed-loop control system. The lifting and drive actuator mechanisms are also to be considered as included in the above named lifting and drive systems.

The invention takes advantage of the fact that when static and dynamic tipping loads are exerted on the industrial truck, the wheels located in the direction of the tipping are subjected to a higher load and the wheels located on the opposite side are subjected to a lower load. When the truck tips over, the wheels opposite to the direction of tipping are lifted up. To determine the transverse tipping forces on a counterbalanced fork lift truck, for example, all that is necessary is to measure the wheel loads of the front wheels and compare them with each other. The information obtained can then be used to control the drive traction system of the industrial truck and/or the load elevation system in a closed-loop or open-loop control system. The term "drive traction system" is used here to generally identify all the systems on the truck that correspond to the drive train, the brakes and the steering system.

For this purpose, the monitoring device is effectively connected with actuator units for the inclination of a lifting mast and/or the height of the load and/or the truck speed or acceleration and/or the braking intensity and/or the steering angle. It is also possible, of course, to influence additional variables that are relevant for static and dynamic stability, such as the steering speed, for example.

The invention also teaches that it is particularly advantageous if wheel load sensors are provided on all the wheels. In that case, not only transverse tipping forces but also longitudinal tipping forces and tipping moments can be measured. Sensors on all the wheels also provide additional information in the form of the load being lifted as the sum of the individual wheel loads.

If at least one wheel on each side of the front axle has at least one wheel bearing that has an integrated wheel load sensor, the effort required to measure the wheel loads is minimized, because no special force transducers are necessary. Wheel bearings with an integrated wheel load sensor are called "load-sensing bearings" and suitable examples are described, for example, in EP 0 637 734 A, herein incorporated by reference. It is also possible, however, to use other conventional wheel load sensors to determine the wheel load, such as sensors that measure the proximity to the road or floor (the distance to the road or floor decreases as the wheel load increases), by means of which the wheel load can be measured indirectly.

The monitoring device is preferably equipped with an evaluation unit which is configured so that it can determine or calculate the transverse tipping forces and/or longitudinal tipping forces and/or the load moment and/or the load. For example, from the difference between the wheel loads on the front axle, such an evaluation unit can generate a signal that represents the magnitude of the transverse tipping forces. The difference between the front and rear wheel loads is representative of the longitudinal tipping forces. Under static conditions, this difference is representative of the moment load on a fork lift truck, i.e., of the moment around the front axle exerted by the load. By comparing the sum of the wheel loads on both the unloaded vehicle and on the loaded vehicle under static conditions, it is possible to determine the weight of the load being carried.

If at least two wheels, preferably on the same axle, each have a speed-of-rotation sensor, the evaluation unit provided in the context of the monitoring device can be used to determine both the speed of travel of the industrial truck as well as its steering radius and the steering angle of the steered wheel.

As a function of the tipping forces determined, the speed of travel or the wheel angle can be limited, or other suitable stabilization measures can be taken. The steering radius of the industrial truck of the invention can thereby be determined from the difference between the speeds of rotation of the wheels on the different sides of the industrial truck.

In this context, the invention teaches that it is advantageous if each wheel sensor is integrated into a wheel bearing.

In an additional improvement of the invention, the monitoring device is connected to a display unit for the load and/or the load moment and/or the vehicle speed or acceleration and/or the turning radius and/or the tipping forces. In this manner, the driver can always be informed of the operating status of the industrial truck and can take action to counteract a hazardous operating condition in its early stages, or can at least prepare himself to react to it.

BRIEF DESCRIPTION OF THE DRAWINGS

Additional details and advantages of the invention are explained in greater detail below with reference to the exemplary embodiment that is illustrated in the accompanying figures, in which.

DESCRIPTION OF THE PREFERRED EMBODIMENT

Figure 1:
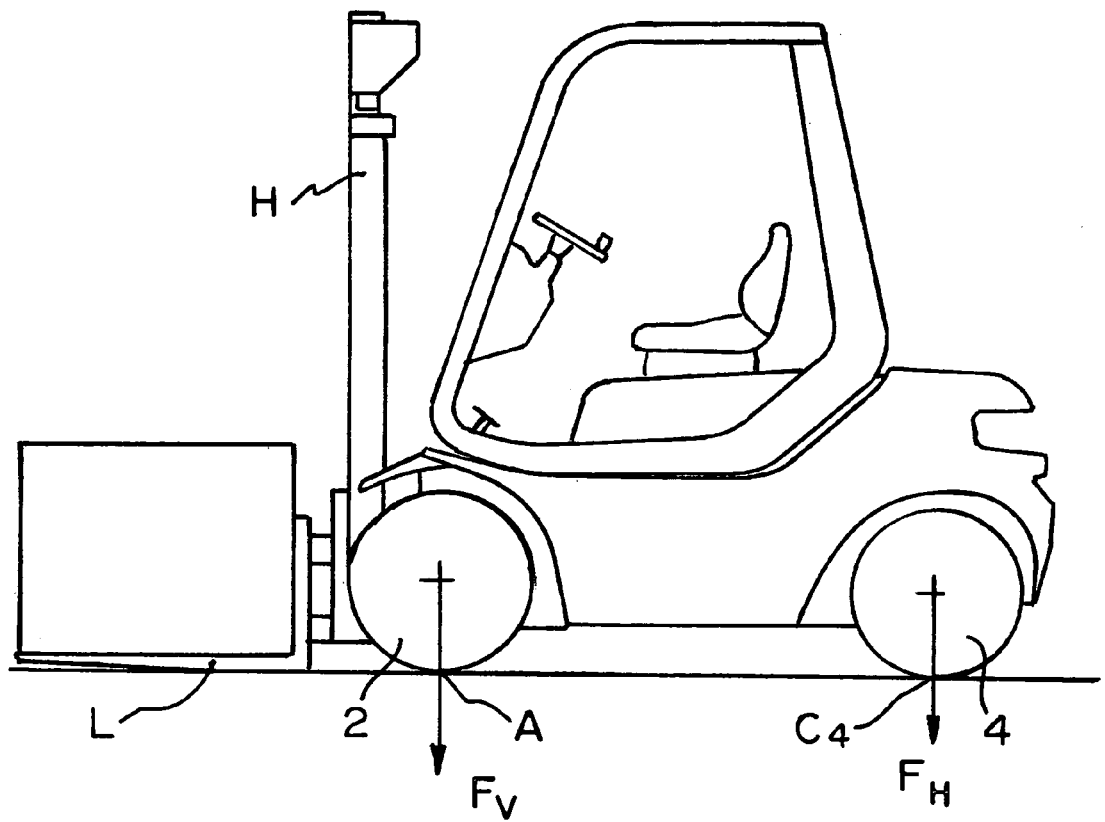
FIG. 1 is a side view of an exemplary counterbalanced fork lift truck of the invention.
Figure 3:
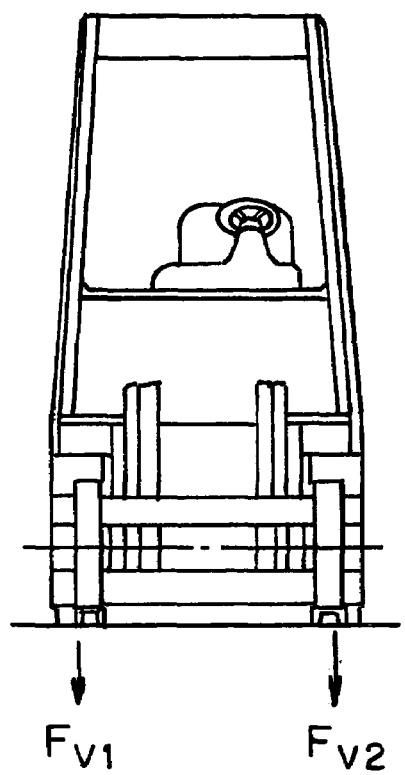
FIG. 3 is a head-on view of the fork lift truck of FIG. 1.

In the exemplary embodiment shown in FIGS. 1 and 3, the industrial truck of the invention is in the form of a counterbalanced fork lift truck with a front lifting mast H and a load holding device L. There is an axial force $F_V$ on the front axle and an axial force $F_H$ on the rear axle, whereby $F_V$ is generally significantly greater than $F_H$, if a correspondingly heavy load is located on the load holding device L.

Figure 2:
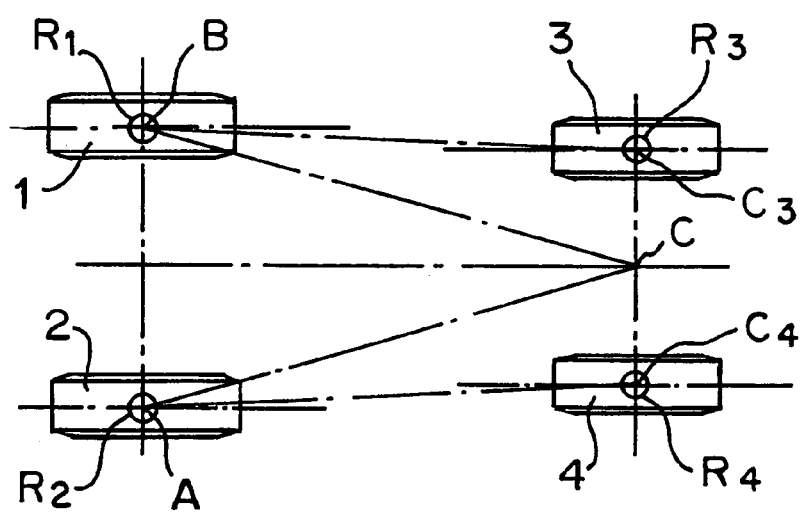
FIG. 2 is an illustration of the stability triangle/stability rectangle and the location of the wheel load sensors for the truck of FIG. 1.

FIG. 2 shows the stability triangle and the stability rectangle for the truck of FIG. 1. The stability triangle on counterbalanced fork lift trucks is independent of whether the vehicle has three wheels or four wheels. On three-wheel trucks, a swivel-pin or single pivot is used as the rear axle, and on four-wheel trucks, a floating or swing axle is used. (The expression "three-wheel" as used herein also includes trucks that have tandem wheels on the single pivot.) In all cases, the stability triangle A-B-C is formed by the front support points A and B on the wheels 1 and 2 and the rear axle suspension point C of the floating or swing axle. In the transverse direction, therefore, the industrial truck will initially tip along the line B-C or A-C. If the floating axle comes into contact on one side against a stop or if its floating or swing movement is blocked, the tip C of the stability triangle A-B-C is shifted toward the support points $C_3$ or $C_4$ on the wheels 3 or 4, respectively. The further tipping of the industrial truck in the transverse direction is then determined by the line B-$C_3$ or A-$C_4$.

In the longitudinal direction, the industrial truck can tip forward around the axis A-B, for example, if the load is very heavy and the truck is braked suddenly.

On at least one wheel 1, 2, 3 and 4, preferably on each wheel 1, 2, 3 and 4, there is a wheel load sensor $R_1$, $R_2$, $R_3$ and $R_4$, respectively. These wheel load sensors are preferably integrated into the corresponding wheel bearings (such bearings are known as "load-sensing bearings"). Other types of sensors can also be used as wheel load sensors, e.g. conventional floor or ground proximity sensors, for the determination of the axial forces. At least two wheels, preferably the wheels on one axle, e.g., the wheels 1 and 2 or the wheels 3 and 4, may also have individual speed-of-rotation sensors $S_U$ and $S_G$, respectively, which can also be integrated into the wheel bearings.

Figure 4:
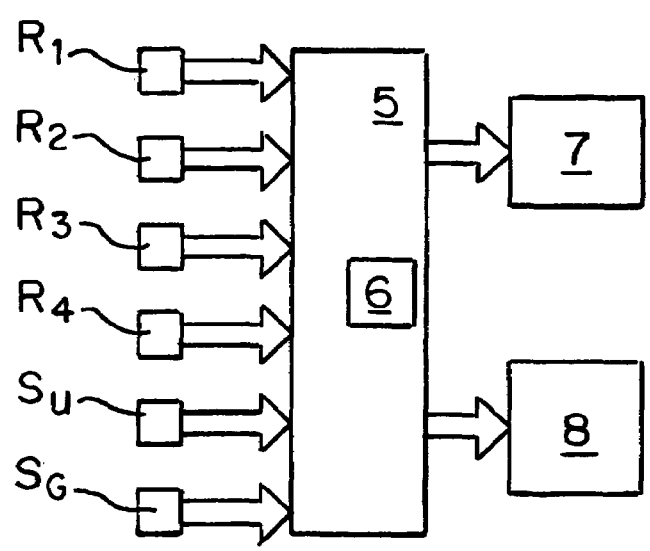
FIG. 4 is a schematic diagram of a stabilizing device of the invention.

As shown in FIG. 4, the wheel load sensors $R_1$, $R_2$, $R_3$ and $R_4$ as well as the speed-of-rotation sensors $S_U$ and $S_G$ are connected, e.g., electronically connected, to a monitoring device 5 which contains an evaluation unit 6, such as a computer or similar device. The monitoring device 5 is connected, e.g., electronically connected, to the load lifting system 7 and the traction drive system 8 (the latter also includes the braking device and the steering device) of the industrial truck.

The transverse tipping forces and/or the longitudinal tipping forces and/or the load moment and/or the load are determined or calculated by the evaluation unit 6 based on the wheel loads sensed by the wheel load sensors. This arrangement takes advantage of the fact that when static and dynamic tipping loads are exerted on the industrial truck, a greater load is applied to the wheels in the direction of the tipping and a lesser load is applied to the wheels on the opposite side. During tipping, the wheels in the direction opposite to the tipping are elevated. To determine the transverse tipping forces of the counterbalanced fork lift truck, for example, it is sufficient to measure the wheel loads $F_{V1}$ and $F_{V2}$ of the front wheels 1 and 2, respectively, and compare them to each other (see FIG. 3). From the difference between the wheel loads $F_{V1}$ and $F_{V2}$ a signal may be then determined by the monitoring device 5 that represents the magnitude of the transverse tipping forces. The difference between the front and rear wheel loads is representative of the longitudinal tipping forces. Under static conditions, the latter difference is representative of the moment load on a fork lift, i.e., of the moment exerted by the load around the axis A-B. The weight of the load being carried can be determined by comparing the sum of the wheel loads on an unloaded and loaded lift truck, both under static conditions. The evaluation unit 6 can also determine both the speed of travel of the industrial truck of the invention as well as its steering radius or the wheel angle of the steered wheel. The steering radius of the industrial truck of the invention is thereby determined from the difference between the speeds of rotation of two wheels, preferably the wheels on the same axle.

On the basis of the data that describe the status of the industrial truck determined by the evaluation unit 6, the monitoring device 5 can be used to control and/or regulate the actuator units (which can be supplemented or replaced, as necessary, by the actuator mechanisms or control units) of at least one operational system of the truck, e.g., to control the inclination of the lifting mast H and/or the height of the load and/or the speed or acceleration of the truck and/or the braking intensity and/or the steering angle to counteract the tipping force. For example, the speed of the truck or the wheel angle can be limited as a function of the tipping forces measured, or other suitable measures to stabilize the truck can be taken.

The monitoring device 5 can also be connected to a display unit 10 for the load and/or the load moment and/or the truck speed or acceleration and/or the turning radius and/or the tipping forces. In this manner, the driver can always be informed of the operating status of the industrial truck, and can counteract or at least react to a hazardous operating situation at an early stage.

Although the exemplary embodiment described above was described with reference to a counterbalanced fork lift truck, it is to be understood that the invention is not limited to use with such trucks.

While the invention is described in detail herein, it will be appreciated by those skilled in the art that various modifications and alternatives to the arrangements can be developed in light of the overall teachings of the disclosure. Accordingly, the particular arrangements described above are illustrative only and are not limiting as to the scope of the invention, which is to be given the full breadth of the appended claims and any and all equivalents thereof.

The invention claimed is:

1. An industrial truck, comprising:
a plurality of wheels;
a load lifting system;
a drive system;
a stabilizing device configured to prevent tipping of the truck and comprising a plurality of wheel load sensors, each load sensor connected to an individual wheel and configured to measure a wheel load, wherein each load sensor is an integrated wheel load sensor; and
a monitoring device,
wherein at least two wheels of the truck have a speed-of-rotation sensor connected to the monitoring device to determine a speed and steering radius of the truck,
wherein the monitoring device includes an evaluation unit configured to determine transverse tipping forces, longitudinal tipping forces, tipping movements, and load weight based on the measured wheel loads, speed, and steering radius, and
wherein the monitoring device is effectively connected with actuator units to control inclination of a lifting mast, adjusting the height of a load, adjusting vehicle speed, adjusting vehicle acceleration, adjusting braking intensity, and adjusting steering angle, and wherein the monitoring device is configured to control the load lifting system and the drive system of the truck based on the wheel load and speed-of-rotation sensor data to counteract a measured tipping force.

2. The industrial truck as claimed in claim 1, wherein each speed-of-rotation sensor is integrated into a wheel bearing.

3. The industrial truck as claimed in claim 1, wherein the monitoring device includes an evaluation unit configured to measure the speed of the truck.

4. The industrial truck as claimed in claim 1, wherein the monitoring device is connected to a display unit for displaying at least one of a load, a load moment, a truck speed, an acceleration, a turning radius, and tipping forces.

5. The industrial truck as claimed in claim 1, wherein the industrial truck is a counterbalanced fork lift truck.

6. The industrial truck as claimed in claim 1, wherein the two wheels with the speed-of-rotation sensors are located on the same axle.

* * * * *